United States Patent Office 2,770,546
Patented Nov. 13, 1956

2,770,546
METAL DEACTIVATORS

Ralph B. Thompson, Hinsdale, Ill., assignor to Universal Oil Products Company, Des Plaines, Ill., a corporation of Delaware No Drawing. Application February 26, 1954,
Serial No. 412,950

18 Claims. (Cl. 99—163)

This application relates to a novel method of deactivating the catalytic effect of a metal contained in an organic substance to catalyze oxidative deterioration of the organic substance.

The novel method of the present invention is particularly applicable to the treatment of fatty materials, including edible and inedible fats and oils. These materials are prepared, stored and/or transported in equipment made of metal and thereby tend to undergo oxidative deterioration due to the catalytic effect of the metal and/or due to the metal constituents contained in the fatty material. The fats and oils are of animal, vegetable or mineral origin. Typical representatives of edible fats and oils include linseed oil, menhaden oil, cod liver oil, castor oil, olive oil, rapeseed oil, coconut oil, palm oil, corn oil, sesame oil, peanut oil, soy bean oil, babassu oil, butter, fat, lard, beef tallow, etc., as well as the hydrogenated oils. It is understood that other oils and fats may be treated within the scope of the present invention, including oils and fats which have previously been subjected to various treatments, such as blowing with air, heat treatment, hydrogenation, etc.

Hydrocarbon distillates, including motor fuels and particularly unsaturated gasoline such as cracked gasoline, polymer gasoline, etc., are refined, in one method, in a process known as the copper sweetening process, in which process the gasoline is contacted with a copper containing reagent. As a result of this treatment, the sweetened gasoline usually contains relatively small amounts of compounds which have a catalytic effect on oxidation reactions occurring when the gasoline comes into contact with air. In addition, gasolines come in contact with various materials in the course of the refining, storing and shipping operations, and this also may result in the gasoline containing minor amounts of such materials as iron, cobalt, nickel manganese, chromium, lead, etc.

Illustrative examples of other organic substances which may be treated by the novel process of the present invention include other hydrocarbon distillates, such as kerosene, diesel oil, mineral oil, lubricating oil, fuel oil, etc., drying oil, resins, rubber, greases, waxes, adhesives, solid food products, essential oils, photographic developers, monomers including styrene, butadiene, isoprene, etc., acetylenes, alcohols, acids, ketones, etc. It is understood that these are merely typical illustrations and that other substrates containing metals may be treated in accordance with the present invention.

The compounds of the present invention which serve to deactivate the catalytic effect of metals are referred to as metal deactivators. These metal deactivators act on the metals present in the organic substance and, therefore, are effectively utilized in any substrate containing or contacting metals. The metal deactivators are distinguished from other additives generally added to organic substances for various purposes. For example, in gasoline, a gum inhibitor is normally added to suppress gum formation. The metal deactivator does not substantially suppress gum formation in gasoline in the absence of metals, and, on the other hand, the gum inhibitor does not suppress the catalytic effect of metals to any considerable extent.

An antioxidant is added in edible fats and oils in order to retard the development of rancidity therein. The metal deactivator will not substantially suppress rancidity development of edible fats and oils in the absence of metals, and the antioxidant will not suppress the catalytic effect of metals in the edible fats and oils to any considerable extent. Still another typical example is in the treatment of rubber in which an antioxidant and metal deactivator are both utilized in order to prevent undesirable deterioration of the rubber, which may result in brittleness, discoloration, decreased elasticity, etc. It is understood that these are set forth merely as representative examples and not with the intention of limiting the invention thereto. The metal deactivator and other additives supplement each other in serving to stabilize organic substrates and to prevent undesirable deterioration thereof.

In one embodiment the present invention relates to a method of stabilizing an organic substance against oxidative deterioration catalyzed by a metal which comprises incorporating in said organic substance a tropolone compound.

In a specific embodiment the present invention relates to a method of stabilizing lard against oxidative deterioration catalyzed by a metal, which comprises incorporating in the lard from about 0.00001% to about 0.5% by weight of 6-methyltropolone.

In another specific embodiment the present invention relates to a method of stabilizing cracked gasoline against oxidative deterioration catalyzed by a metal, which comprises incorporating in the gasoline from about 0.00001% to about 0.5% by weight of 3,6-dibutyltropolone.

As hereinbefore set forth, the novel metal deactivator of the present invention comprises a tropolone compound. Tropolone may be represented by the following general formula:

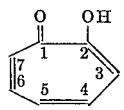

The tropolone compound for use in accordance with the present invention may comprise tropolone and/or derivatives thereof. The derivatives include tropolone substituted on the nucleus with hydrocarbon groups including alkyl, aralkyl, alkenyl, aryl, alkaryl, cycloalkyl, etc. radicals. In some cases, the derivatives may comprise substituent groups containing oxygen, nitrogen and/or sulfur, including these contained in heterocyclic ring radicals.

Representative compounds of the alkyl substituent derivatives include 3-methyltropolone, 3-ethyltropolone, 3-propyltropolone, 3-butyltropolone, 3-amyltropolone, 3-hexyltropolone, 3-heptyltropolone, 3-octyltropolone, 3-nonyltropolone, 3-decyltropolone, 3-undecyltropolone, 3-dodecyltropolone, etc., 4 - methyltropolone, 4 - ethyltropolone, 4-propyltropolone, 4-butyltropolone, 4-amyltropolone, 4-hexyltropolone, 4-heptyltropolone, 4-octyltropolone, 4-nonyltropolone, 4-decyltropolone, 4-undecyltropolone, 4-dodecyltropolone, etc., 5-methyltropolone, 5-ethyltropolone, 5-propyltropolone, 5-butyltropolone, 5-amyltropolone, 5-hexyltropolone, 5-heptyltropolone, 5 - octyltropolone, 5 - nonyltropolone, 5 - decyltropolone, 5-undecyltropolone, 5-dodecyltropolone, etc., 6-methyltropolone, 6 - ethyltropolone, 6 - propyltropolone, 6-butyltropolone, 6 - amyltropolone, 6 - hexyltropolone, 6-heptyltropolone, 6-octyltropolone, 6-nonyltropolone, 6- decyltropolone, 6-undecyltropolone, 6-dodecyltropolone, etc., 7 - methyltropolone, 7 - ethyltropolone, 7 - propyltropolone, 7-butyltropolone, 7-amyltropolone, 7-hexyltropolone, 7-heptyltropolone, 7-octyltropolone, 7-nonyltropolone, 7 - decyltropolone, 7 - undecyltropolone, 7-dodecyltropolone, etc., 3,6 - dimethyltropolone, 3,6 - diethyltropolone, 3,6 - dipropyltropolone, 3,6 - dibutyltropolone, 3,6 - diamyltropolone, 3,6 - dihexyltropolone, 3,6-diheptyltropolone, 3,6-dioctyltropolone, etc., 4,5-dimethyltropolone, 4,5 - diethyltropolone, 4,5 - dipropyltropolone, 4,5-dibutyltropolone, 4,5-diamyltropolone, 4,5-dihexyltropolone, 4,5 - diheptyltropolone, 4,5 - dioctyltropolone, etc., 3,4,5-trimethyltropolone, 3,4,5-triethyltropolone, 3,4,5 - tripropyltropolone, 3,4,5 - tributyltropolone, 3,4,5-triamyltropolone, 3,4,5-trihexyltropolone, etc., 3,4,6 - trimethyltropolone, 3,4,6 - triethyltropolone, 3,4,6-tripropyltropolone, 3,4,6-tributyltropolone, 3,4,6-triamyltropolone, 3,4,6-trihexyltropolone, etc. It is understood that where more than one alkyl group is attached to the nucleus, the alkyl groups may be different and will be selected from the alkyl radicals containing from 1 to 12 or more carbon atoms per group.

Illustrative compounds containing an aralkyl substitution include 3-benzyltropolone, 3-phenethyltropolone, 3 - phenpropyltropolone, 3 - phenbutyltropolone, etc., 4-benzyltropolone, 4-phenethyltropolone, 4-phenpropyltropolone, 4-phenbutyltropolone, etc., 5-benzyltropolone, 5-phenethyltropolone, 5-phenpropyltropolone, 5-phenbutyltropolone, etc., 6-benzyltropolone, 6-phenethyltropolone, 6-phenpropyltropolone, 6-phenbutyltropolone, etc., 7-benzyltropolone, 7-phenethyltropolone, 7-phenpropyltropolone, 7-phenbutyltropolone, etc., 3,4-dibenzyltropolone, 3,4-diphenethyltropolone, 3,4-diphenpropyltropolone, 3,4-diphenbutyltropolone, etc., 3,5-dibenzyltropolone, 3,5-diphenethyltropolone, 3,5-diphenpropyltropolone, 3,5-diphenbutyltropolone, etc., 3,6-dibenzyltropolone, 3,6-diphenethyltropolone, 3,6-diphenpropyltropolone, 3,6-diphenbutyltropolone, etc., 4,5-dibenzyltropolone, 4,5-diphenethyltropolone, 4,5-diphenpropyltropolone, 4,5-diphenbutyltropolone, etc., 3,4,5-tribenzyltropolone, 3,4,5 - triphenethyltropolone, 3,4,5 - triphenpropyltropolone, 3,4,5-triphenbutyltropolone, etc., 3,4,6-tribenzyltropolone, 3,4,6 - triphenethyltropolone, 3,4,6-triphenpropyltropolone, 3,4,6-triphenbutyltropolone, etc., 4,5,6 - tribenzyltropolone, 4,5,6 - triphenethyltropolone, 4,5,6-triphenpropyltropolone, 4,5,6-triphenbutyltropolone, etc.

Illustrative compounds containing alkenyl radicals include mono- and polyvinyltropolones, mono- and polyallyltropolones, mono- and polymethallyltropolones, etc. Illustrative compounds containing aryl radicals include mono- and polyphenyltropolones, mono- and polytolyltropolones, mono- and polyxylyltropolones, mono- and polyethylphenyltropolones, etc. Illustrative compounds containing cyclohexyl radicals include mono- and polycyclopentyltropolones, mono- and polycyclohexyltropolones, etc. When two or more substituents are attached to the nucleus, it is understood that the substituents may be different and thus include compounds as 3-alkyl-6-phenyltropolones, 3-phenyl-6-alkyltropolones, 4-cycloalkyl-6-alkyltropolones, etc.

It is understood that many compounds may be prepared and used in accordance with the present invention and that all of these compounds are not necessarily equivalent. The particular compound to be employed will depend upon the particular substrate in which it is to be used.

As hereinbefore set forth, the metal deactivator generally will be used in conjunction with other additives. The other additive will depend upon the particular substrate being stabilized. For example, in the stabilization of edible fats and oils, a preferred antioxidant comprises butylated hydroxyanisole. Other antioxidants include nordihydroguaiaretic acid (N. D. G. A.), gum guaiac, propyl gallate, lauryl thiodipropionate, various alkylated phenolic compounds including 2,6-ditertiary-butyl-4-methylphenol, etc. As applied to gasoline, satisfactory gum inhibitors include various phenols, amines, aminophenols, fractions of wood tar, etc. Some of these inhibitors are marketed in the form of a solution in a solvent such as alcohol, ether, etc. A particularly suitable gum inhibitor comprises a p-phenylene diamine and more particularly N,N'-di-secondary-butyl-p-phenylene diamine. Other phenylene diamine compounds include N,N' - diisopropyl - p - phenylene diamine, N,N'-di-secondary-amyl-p-phenylene diamine, N,N'-di-secondary-hexyl-p-phenylene diamine, etc., N-propyl-N'-butyl-p-phenylene diamine, N-butyl-N'-amyl-p-phenylene diamine, etc. Another particularly suitable gum inhibitor comprises a p-aminophenol and more particularly a mixture of a major proportion of N-n-butyl-p-aminophenol and a minor proportion of N,N'-di-n-butyl-p-phenylene diamine in an alcoholic solvent. Other p-aminophenol compounds include N-propyl-p-aminophenol, N-amyl-p-aminophenol, N-hexyl-p-aminophenol, etc. Still other suitable inhibitors comprise butylated hydroxyanisole, 2,4-dimethyl-6-tertiary-butylphenol and 2,2-dimethyl-6-tertiary-butyl-5-hydroxy-coumaran.

The antioxidant, gum inhibitor or other additive generally is utilized in concentrations of below about 1% by weight and preferably from about 0.0001% to about 1% by weight. As hereinbefore set forth, the metal deactivator is utilized in small concentrations and thus may range from about 0.00001% to about 0.5% by weight of the substrate. The metal deactivator may be marketed as such or dissolved in a suitable solvent which is not reactive therewith. In some cases, when a solvent is used for the antioxidant, gum inhibitor, etc., the same solvent may be used for the metal deactivator and thus the two or more compounds, when desired, may be prepared as a mixture in a suitable solvent and the product marketed as a single commodity of a two-fold purpose.

The following examples are introduced to illustrate further the novelty and utility of the present invention but not with the intention of unduly limiting the same.

*Example I*

The lard used in this example had a Schaal Oven stability period of 2 days. The Schaal Oven test is a standard method of determining stability of fats and oils.

The addition of 0.02% by weight of 6-methyltropolone to a sample of the lard increased the stability period of the lard to only 3 days. It is thus seen that the tropolone compound is of substantially no effectiveness in preventing oxidative deterioration of lard in the absence of metals.

*Example II*

The lard used in this example had a Schaal Oven stability of 4 days. Upon the addition of copper to the lard by inserting therein a 3 inch coil of No. 18 copper wire, the stability period of the lard dropped to 2 days. 0.02% by weight of butylated hydroxyanisole was added to another sample of the lard and this served to increase the Schaal Oven time to 36 days. However, upon the addition of 0.02% by weight of butylated hydroxyanisole to another sample of the lard containing copper wire, the Schaal Oven time of the lard dropped to 5 days. To another sample of the lard containing both 0.02% by weight of butylated hydroxyanisole and copper wire, 0.02% by weight of 6-methyltropolone was added, and the Schaal Oven time was 28 days. It is thus seen that the tropolone compound of the present invention served to considerably offset the deleterious effect of the copper. This example also illustrates the difference between the antioxidant and the metal deactivator.

*Example III*

To a Pennsylvania thermally cracked gasoline having an induction period of about 100 minutes, 0.005% by weight of an antioxidant comprising N,N'-di-secondarybutyl-p-phenylene diamine is added, and the induction period will be increased to about 560 minutes. Upon the addition of 1 mg. of copper, in the form of copper oleate, per liter of gasoline, the induction period of gasoline will fall to about 120 minutes. However, upon the addition of 0.001% by weight of 6-tertiary-butyltropolone to another sample of the gasoline containing 0.005% by weight of N,N'-di-secondary-butyl-p-phenylene diamine and 1 mg. of copper per liter, the induction period of gasoline will be of the order of 550 minutes.

*Example IV*

Paraffin wax may be stabilized against oxidative deterioration and deterioration caused by metal constituents by incorporating in the wax 0.02% by weight of an antioxidant and 0.01% by weight of 3,6-diisopropyltropolone.

*Example V*

This example illustrates the use of the metal deactivator for the stabilization of rubber to prevent oxidative deterioration catalyzed by metals. 0.1% by weight of 3,6-dihexyltropolone may be added to the latex resulting from the emulsion polymerization of butadiene and styrene, after which the latex is coagulated and dried. This will serve to retard oxidative deterioration catalyzed by metals, and the rubber will be improved as to retention of color, strength, elasticity, etc.

I claim as my invention:

1. A method of stabilizing an organic substance against oxidative deterioration catalyzed by a metal constituent which comprises incorporating in said organic substance a tropolone compound.

2. A method of stabilizing an organic substance against oxidative deterioration catalyzed by a metal constituent which comprises incorporating in said organic substance an alkyltropolone.

3. A method of stabilizing an organic substance against oxidative deterioration catalyzed by a metal constituent which comprises incorporating in said organic substance methyltropolone.

4. A method of stabilizing a fatty material against oxidative deterioration catalyzed by a metal constituent which comprises incorporating therein from about 0.00001% to about 0.5% by weight of a tropolone compound.

5. A method of stabilizing lard against oxidative deterioration catalyzed by a metal constituent which comprises incorporating therein from about 0.00001% to about 0.5% by weight of 6-methyltropolone.

6. A method of stabilizing an organic substance against oxidative deterioration and deterioration catalyzed by a metal constituent which comprises incorporating therein an antioxidant and a metal deactivator comprising a tropolone compound.

7. An organic substance containing a metal constituent which normally catalyzes deterioration of said substance and additionally containing a tropolone compound.

8. An organic substance containing a metal constituent which normally catalyzes deterioration of said substance and additionally containing an alkyltropolone.

9. An organic substance containing a metal constituent which normally catalyzes deterioration of said substance and additionally containing methyltropolone.

10. Fatty material containing a metal constituent which normally catalyzes deterioration thereof and additionally containing a tropolone compound.

11. Lard containing from about 0.00001% to about 0.5% by weight of a tropolone compound.

12. Lard containing from about 0.00001% to about 0.5% by weight of an alkyltropolone.

13. Lard containing from about 0.0001% to about 1% by weight of butylated hydroxyanisole and from about 0.00001% to about 0.5% by weight of 6-methyltropolone.

14. Motor fuel containing a metal constituent which normally catalyzes deterioration and additionally containing a tropolone compound.

15. Cracked gasoline containing from about 0.0001% to about 1% by weight of an antioxidant and from about 0.00001% to about 0.5% by weight of a tropolone compound.

16. Cracked gasoline containing from about 0.0001% to about 1% by weight of N,N'-di-secondary-butyl-p-phenylene diamine and from about 0.00001% to about 0.5% by weight of 6-methyltropolone.

17. Rubber containing a metal constituent which normally catalyzes deterioration thereof and additionally containing a tropolone compound.

18. Wax containing a metal constituent which normally catalyzes deterioration thereof and additionally containing a tropolone compound.

References Cited in the file of this patent

Chem. Abst. 47, 1522 (*f*), abstracted from Nature 170 (1952), pages 247–8, Bryant et al.

Chem. Abst. 43, 5016 (*b*), abstracted from Acta Chem. Scand. 2 (1948), pages 625–38.